United States Patent
Lai

(10) Patent No.: US 9,197,087 B2
(45) Date of Patent: Nov. 24, 2015

(54) PORTABLE CHARGER WITH ROTATABLE LOCKING PORTIONS

(71) Applicant: HON HAI PRECISION INDUSTRY CO., LTD., New Taipei (TW)

(72) Inventor: Chih-Chen Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 199 days.

(21) Appl. No.: 13/931,755

(22) Filed: Jun. 28, 2013

(65) Prior Publication Data

US 2014/0340021 A1 Nov. 20, 2014

(30) Foreign Application Priority Data

May 20, 2013 (TW) .............................. 102117808 A

(51) Int. Cl.
*H02J 7/00* (2006.01)

(52) U.S. Cl.
CPC ............. *H02J 7/0063* (2013.01); *H02J 7/0042* (2013.01); *H02J 7/0044* (2013.01); *H02J 7/0045* (2013.01)

(58) Field of Classification Search
CPC ........................................................ G06F 1/263
USPC .......................................... 320/103; 361/600
See application file for complete search history.

(56) References Cited

U.S. PATENT DOCUMENTS

| | | | | |
|---|---|---|---|---|
| 2,991,376 A | * | 7/1961 | Sherwood et al. | 307/156 |
| 3,796,984 A | * | 3/1974 | Selinko | 439/318 |
| 3,999,110 A | * | 12/1976 | Ramstrom et al. | 320/112 |
| 4,734,049 A | * | 3/1988 | George et al. | 439/259 |
| 4,850,657 A | * | 7/1989 | Placke et al. | 361/679.43 |
| D310,450 S | * | 9/1990 | Castelli et al. | D3/279 |
| D319,061 S | * | 8/1991 | Powell et al. | D14/240 |
| D324,369 S | * | 3/1992 | Bushman et al. | D13/107 |
| 5,142,446 A | * | 8/1992 | Tanaka et al. | 361/679.43 |
| D331,220 S | * | 11/1992 | Tsuchiya | D13/107 |
| D336,281 S | * | 6/1993 | Nakamura et al. | D13/107 |
| 5,251,105 A | * | 10/1993 | Kobayashi et al. | 361/679.58 |
| 5,256,955 A | * | 10/1993 | Tomura et al. | 320/110 |
| D348,427 S | * | 7/1994 | Ohmaki et al. | D13/107 |
| 5,536,590 A | * | 7/1996 | Cheiky | 429/7 |

(Continued)

OTHER PUBLICATIONS

Benefits of Plastics, FuturEnergia, Published Jun. 30, 2009, Accessed Apr. 4, 2015, http://web.archive.org/web/20090630115032/http://www.futurenergia.org/ww/en/pub/futurenergia/energy_world_/benefits.htm.*

(Continued)

*Primary Examiner* — Drew A Dunn
*Assistant Examiner* — John Trischler
(74) *Attorney, Agent, or Firm* — Novak Druce Connolly Bove + Quigg LLP

(57) ABSTRACT

A portable electrical power source configured to provide power for a portable electronic device includes a base, a chargeable battery, a connector, and at least one locking structure. The base includes a first surface and a second surface facing away from the first surface. The base defines a receiving room between the first surface and the second surface and at least one cavity. The chargeable battery is received in the receiving room. The locking structures are rotatably received in the cavities to lock the portable electronic device onto the first surface of the base. The connector is positioned on the first surface and is electrically connected to the chargeable battery and the portable electronic device. The chargeable battery charges the portable electronic device through the connector.

12 Claims, 4 Drawing Sheets

(56) References Cited

U.S. PATENT DOCUMENTS

| | | | |
|---|---|---|---|
| 5,537,343 A * | 7/1996 | Kikinis et al. | 361/679.56 |
| 5,691,618 A * | 11/1997 | Kobayashi et al. | 320/115 |
| 5,764,026 A * | 6/1998 | Issa | 320/104 |
| 5,844,401 A * | 12/1998 | Lee | 320/107 |
| 5,926,627 A * | 7/1999 | Sugimura | 710/303 |
| 6,002,236 A * | 12/1999 | Trant et al. | 320/114 |
| 6,014,011 A * | 1/2000 | DeFelice et al. | 320/114 |
| 6,046,571 A * | 4/2000 | Bovio et al. | 320/113 |
| 6,127,802 A * | 10/2000 | Lloyd et al. | 320/113 |
| D443,247 S * | 6/2001 | Chuan et al. | D13/107 |
| 6,392,383 B1 * | 5/2002 | Takimoto et al. | 320/115 |
| 6,424,524 B2 * | 7/2002 | Bovio et al. | 361/679.45 |
| 6,552,513 B1 * | 4/2003 | Li | 320/115 |
| 6,950,320 B2 * | 9/2005 | Shin | 363/21.15 |
| 7,268,519 B2 * | 9/2007 | Simoes et al. | 320/114 |
| 7,489,105 B2 * | 2/2009 | Weinstein et al. | 320/114 |
| 7,541,774 B2 * | 6/2009 | Zedell et al. | 320/114 |
| 7,557,537 B2 * | 7/2009 | Zick et al. | 320/114 |
| 7,612,997 B1 * | 11/2009 | Diebel et al. | 361/679.56 |
| 7,633,750 B2 * | 12/2009 | Fan et al. | 361/679.43 |
| 7,642,744 B2 * | 1/2010 | Zedell et al. | 320/107 |
| 7,719,229 B2 * | 5/2010 | Kaneko et al. | 320/113 |
| 7,741,809 B2 * | 6/2010 | Zick et al. | 320/114 |
| 7,857,541 B2 * | 12/2010 | Gong | 403/322.3 |
| 7,920,905 B2 * | 4/2011 | Bury | 455/575.1 |
| 7,923,964 B2 * | 4/2011 | Lin et al. | 320/115 |
| D650,327 S * | 12/2011 | Kingston | D13/107 |
| 8,630,088 B2 * | 1/2014 | Collopy et al. | 361/679.55 |
| 8,653,791 B2 * | 2/2014 | Yoneyama et al. | 320/115 |
| 8,680,869 B2 * | 3/2014 | Jiang et al. | 324/437 |
| 9,001,506 B2 * | 4/2015 | Chen et al. | 361/679.55 |
| 2002/0024318 A1 * | 2/2002 | Zeiler | 320/107 |
| 2003/0041206 A1 * | 2/2003 | Dickie | 710/303 |
| 2003/0069050 A1 * | 4/2003 | Lin | 455/572 |
| 2004/0130289 A1 * | 7/2004 | Lam et al. | 320/107 |
| 2005/0035198 A1 * | 2/2005 | Wilensky | 235/383 |
| 2005/0116684 A1 * | 6/2005 | Kim | 320/114 |
| 2005/0183100 A1 * | 8/2005 | Chung | 720/600 |
| 2005/0185372 A1 * | 8/2005 | Chen et al. | 361/685 |
| 2005/0231159 A1 * | 10/2005 | Jones et al. | 320/114 |
| 2006/0126288 A1 * | 6/2006 | Chen et al. | 361/685 |
| 2006/0214630 A1 * | 9/2006 | Huang | 320/112 |
| 2006/0226805 A1 * | 10/2006 | Yu | 320/107 |
| 2007/0080663 A1 * | 4/2007 | Obering | 320/114 |
| 2007/0111086 A1 * | 5/2007 | Li et al. | 429/97 |
| 2007/0210749 A1 * | 9/2007 | Hsieh | 320/114 |
| 2008/0025005 A1 * | 1/2008 | Yeh et al. | 361/752 |
| 2008/0180888 A1 * | 7/2008 | Koutari | 361/679 |
| 2008/0180889 A1 * | 7/2008 | Ozaki | 361/679 |
| 2008/0234013 A1 * | 9/2008 | Bury | 455/575.1 |
| 2009/0128092 A1 * | 5/2009 | Woud | 320/113 |
| 2009/0257205 A1 * | 10/2009 | Itoh et al. | 361/747 |
| 2010/0312938 A1 * | 12/2010 | Stampfli | 710/304 |
| 2011/0056717 A1 * | 3/2011 | Herisse | 173/217 |
| 2011/0169451 A1 * | 7/2011 | Stampfli | 320/115 |
| 2012/0146571 A1 * | 6/2012 | Hsu et al. | 320/101 |
| 2012/0178506 A1 * | 7/2012 | Sorias et al. | 455/573 |
| 2012/0274282 A1 * | 11/2012 | Yoneyama et al. | 320/115 |
| 2012/0306431 A1 * | 12/2012 | Li et al. | 320/101 |
| 2013/0244735 A1 * | 9/2013 | Bury | 455/573 |
| 2014/0110206 A1 * | 4/2014 | Wang | 191/12 R |
| 2014/0152241 A1 * | 6/2014 | Panos | 320/107 |
| 2014/0159640 A1 * | 6/2014 | Yoshikawa et al. | 320/103 |
| 2014/0176072 A1 * | 6/2014 | Lai | 320/115 |

OTHER PUBLICATIONS

Abstract, JP 2000195562 A, Morita, Hideyo, Accessed on EAST from Derwent Database, Accessed Apr. 1, 2015, Published Jul. 2000.*

"Battery Fuel Gauge," Battery University, Cadex, Published May 2011, Accessed Apr. 3, 2015, http://web.archive.org/web/20110501033726/http://batteryuniversity.com/learn/article/the_battery_fuel_gauge.*

"Power Button," Tim Fisher, About.com, Published Aug. 27, 2011, Accessed Apr. 4, 2015, http://web.archive.org/web/20110827085412/http://pcsupport.about.com/od/termsp/g/powerbutton.htm.*

"synonyms for button," Collins English Dictionary and Thesaurus, Published Jun. 6, 2012, Accessed Apr. 2, 2015, http://web.archive.org/web/20120606033948/http://www.collinsdictionary.com/dictionary/english-thesaurus/button.*

"Review: iSound Portable Power Max Backup Battery from RichardSolo—high capacity portable battery for iPad and iPhone," iPhoneJD, Published Oct. 15, 2012, Accessed Apr. 2, 2015, http://www.iphonejd.com/iphone_jd/2012/10/review-isound-portable-power-max-backup-battery.html.*

WIPO 2009137114 A2, Bessa et al, Published Nov. 12, 2009, Accessed Apr. 1, 2015, obtained from DERwent Database.*

* cited by examiner

PORTABLE CHARGER WITH ROTATABLE LOCKING PORTIONS

BACKGROUND

1. Technical Field

The present disclosure relates to a portable electrical power source.

2. Description of Related Art

Portable communication transceivers, such as mobile phones, are ubiquitous. In many instances, it is desirable to provide a visual display on the communications transceiver to supply the operator with a visual message or graphical image. The drawback is that the visual displays require relatively high electrical power, which causes the batteries to be depleted quickly.

Therefore, it is desirable to provide a portable electrical power source that can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
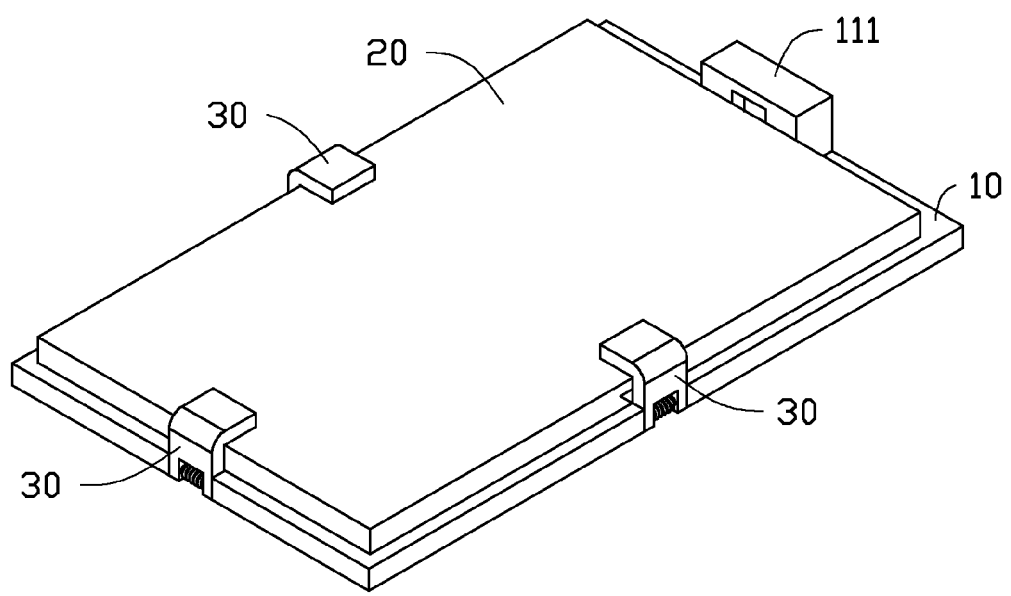
FIG. 1 is an assembled, isometric view of a portable electrical power source in accordance with an exemplary embodiment.
Figure 2:
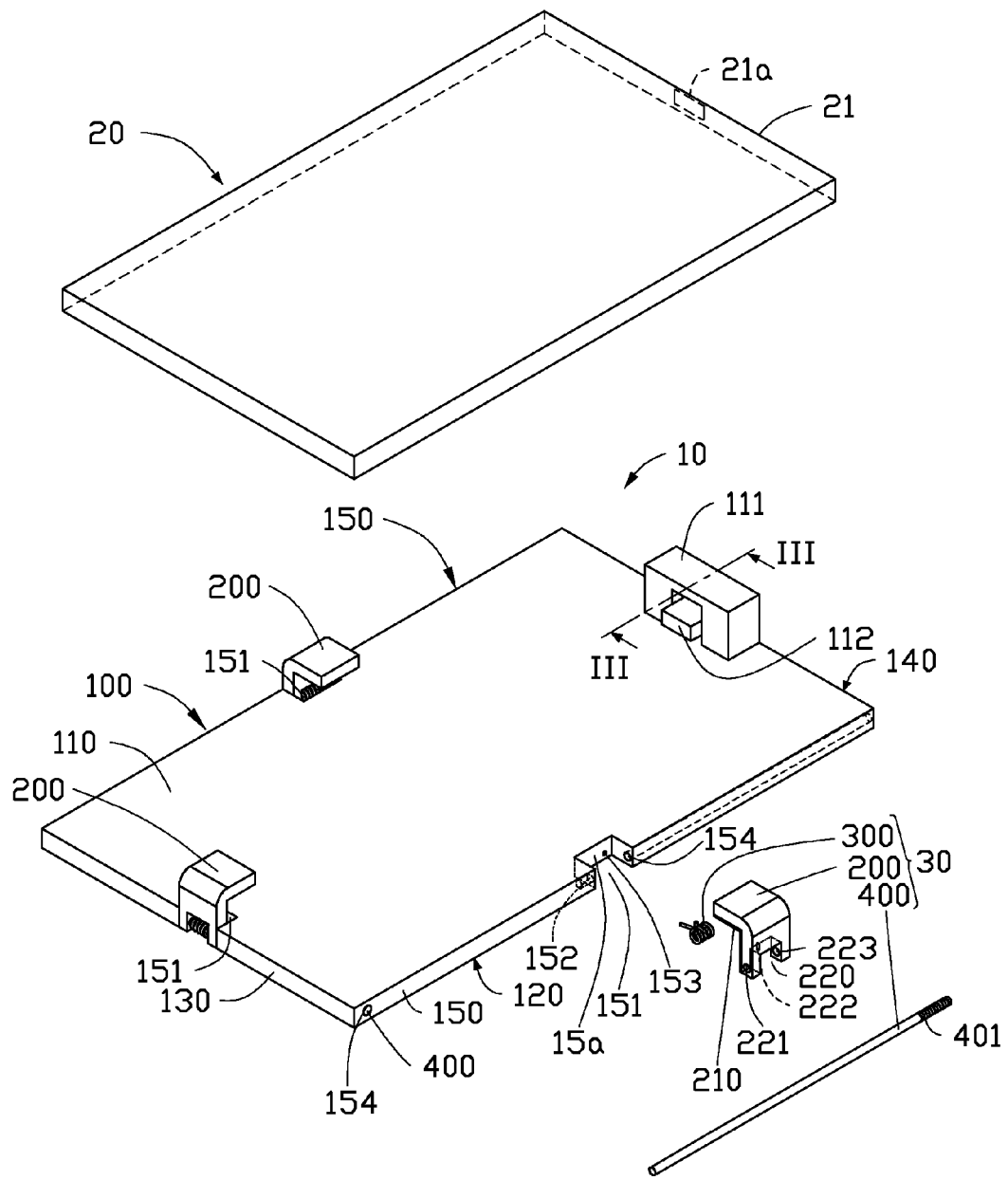
FIG. 2 is an exploded, isometric view of the portable electrical power source of FIG. 1.
Figure 3:
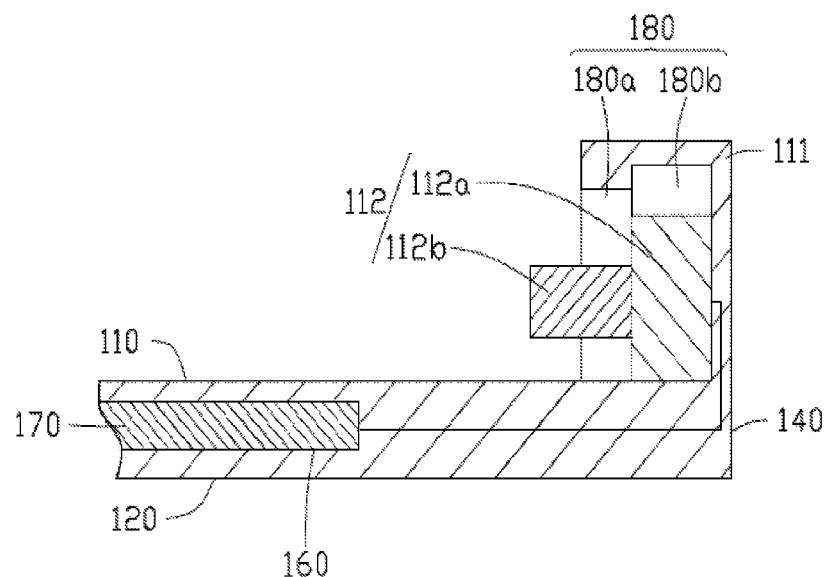
FIG. 3 is a cross-sectional view taken along line III-III of FIG. 2.
Figure 4:
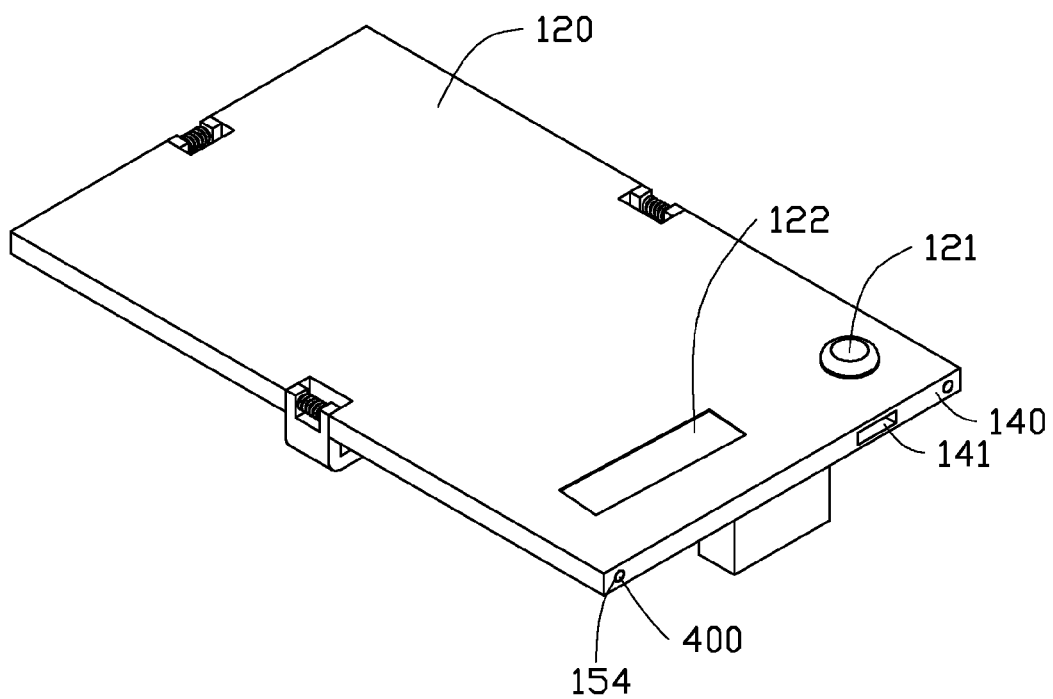
FIG. 4 is similar to FIG. 1, but viewed from another angle.

FIGS. 1-4 show a portable electrical power source 10 configured to provide power for a portable electronic device according to an embodiment. In the embodiment, the electronic device is a mobile phone 20. The mobile phone 20 is rectangular and includes a lower surface 21. The mobile phone 20 also includes a charging port 21a positioned at the lower surface 21.

The power source 10 includes a base 100, a connector 112, a chargeable battery 170, three locking structures 30, and various circuits (not shown).

The base 100 is substantially rectangular and includes a first surface 110, a second surface 120 facing away from the first surface 110, a top surface 130, a bottom surface 140 facing away from the top surface 130, and two opposite sidewalls 150. The first surface 110 is substantially parallel to the second surface 120. The top surface 130 is substantially parallel to the bottom surface 140. Both the top surface 130 and the bottom surface 140 are perpendicularly connected between the first surface 110 and the second surface 120. The two opposite sidewalls 150 are substantially parallel to each other and are perpendicularly connected between the first surface 110 and the second surface 120. The base 10 defines a receiving room 160 between the first surface 110 and the second surface 120 for receiving the chargeable battery 170 and the various circuits.

The base 10 also includes a supporting substrate 111 perpendicularly extending upward from an end of the first surface 110 adjacent to the bottom surface 140. The supporting substrate 111 defines a receiving cavity 180. The receiving cavity 180 includes a first receiving cavity 180a and a second receiving cavity 180b communicating with the first receiving cavity 180a.

The connector 112 includes a supporting portion 112a and a connecting portion 112b connected to the supporting portion 112a. A shape and size of the connecting portion 112b match a shape and size of the charging port 21a of the mobile phone 20. The supporting portion 112a is completely received in the second receiving cavity 180b. One end of the connecting portion 112b is fixedly connected to the supporting portion 112a and is received in the first receiving cavity 180a. The other end of the connecting portion 112b extends out of the first receiving cavity 180a.

In the embodiment, a height of the supporting portion 112a is shorter than a height of the second receiving cavity 180b, such that the supporting portion 112a is capable of moving up and down in the second receiving cavity 180b to adjust a position of the connector 112 with respect to the supporting substrate 111.

The top surface 130 and the two sidewalls 150 each define a cavity 151. Shapes and sizes of the three cavities 151 are the same. The cavities 151 are rectangular. Two opposite internal sidewalls of each cavity 151 defines a blind hole 152 and a first through hole 154 aligning with the blind hole 152. The first through hole 154 runs through the bottom surface 140. An end of the first through hole 154 in the bottom surface 140 forms internal threads (not shown). A vertical surface 15a perpendicularly connected between the two opposite internal sidewalls of the cavity 151 defines a first receiving hole 153.

The three locking structures 30 cooperatively lock the mobile phone 20 onto the first surface 110. Each of the locking structures 30 includes a locking portion 200, a torsion spring 300, and a fixed pole 400.

The locking portion 200 is rectangular. Each of the locking structures 30 also includes a plastic plate 210 positioned on an internal sidewall of the locking portion 200.

Each of the locking portions 200 is rotatably received in the cavity 151 by the torsion spring 300 and the fixed pole 400. One end of each of the locking portions 200 defines a third receiving cavity 220. The third receiving cavity 220 is also rectangular and includes three internal sidewalls. Each of the internal sidewalls defines a second through hole 221 corresponding to the blind hole 152, a second receiving hole 222 corresponding to the first receiving hole 153, and a third through hole 223 corresponding to the first through hole 154. A length of the fixed pole 400 is equal to a distance between the bottom surface 140 and a bottom of the blind hole 152. As such, the fixed pole 400 is completely received in the base 10. The fixed pole 400 includes external threads 401 on an end of it.

In assembly, the torsion spring 300 is received in the third receiving cavity 220 with one end of the torsion spring 300 inserted into the second receiving hole 222 and the other end inserted into the first receiving hole 153. The fixed pole 400 is inserted through the first through hole 154 and the torsion spring 300 is received in the blind hole 152 with the external threads 401 engaging with the internal threads of the first through hole 154. Therefore, the locking portions 200 are partly and rotatably received in the cavities 151.

In the embodiment, the base 100 also includes a power button 121 and a power indicator 122. Both the power button 121 and the power indicator 122 are positioned on the second surface 120. The power button 121 controls the charging of the mobile phone 20. When the power button 121 is pressed, the mobile phone 20 is charged by the portable electrical power source 10. When the power button 121 is pressed again, the portable electrical power source 10 stops charging the mobile phone 20. The power indicator 122 displays the amount of power remaining in the chargeable battery 170.

In the embodiment, the base 100 also includes a first charging port 141 connected to an external power source (not shown) for charging the chargeable battery 170. The first charging port 141 is positioned on the bottom surface 140.

The various circuits are configured to electrically connect the connector 112, the first charging port 141, the power button 121, the power indicator 122, and the chargeable battery 170 together.

In use, the locking portions 200 are bent outward from the first surface 110. The mobile phone 20 is pushed along a passage defined by the two locking portions 200 positioned on the two opposite sidewalls 150. Then, the three locking portions 200 are bent back toward the first surface 110, and the mobile phone 20 is securely fastened by the plastic plates 210, such that the connector 112 is received in the charging port 21a of the mobile phone 20. Pressing the power button 121 charges the mobile phone 20 through the connector 112.

When the mobile phone 20 is finished charging, pressing the power button 121 again stops the portable electrical power source 10 from charging the mobile phone 20.

It is noteworthy that, in alternative embodiments, the first charging port 141 can be positioned on the second surface 120 or on the top surface 130. The power button 121 can be positioned on an end of the second surface 120 adjacent to the top surface 130, and the base 100 can define any number of cavities 151 with corresponding locking structures 30.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. A portable electrical power source configured to provide power for a portable electronic device, the portable electrical power source comprising:
    a base comprising a first surface and a second surface facing away from the first surface, the base defining a receiving room between the first surface and the second surface, and at least one cavity, the base further comprising a bottom surface connected between the first surface and the second surface, the base further comprising a supporting substrate extending upward from an end of the first surface adjacent to the bottom surface, the supporting substrate defining a receiving cavity for receiving the connector, the receiving cavity comprising a first receiving cavity and a second receiving cavity communicating with the first receiving cavity;
    a chargeable battery received in the receiving room;
    at least one locking structure rotatabley received in the at least one cavity and configured for locking the portable electronic device onto the first surface of the base; and
    a connector positioned on the first surface and electrically connected to the chargeable battery, the connector configured to electrically connected to the portable electronic device, the chargeable battery charging the portable electronic device through the connector, the connector comprising a supporting portion and a connecting portion connected to the supporting portion, the supporting portion completely received in the second receiving cavity, one end of the connecting portion fixedly connected to the supporting portion and received in the first receiving cavity, the other end of the connecting portion extending out of the first receiving cavity.

2. The portable electrical power source of claim 1, wherein the base comprises a power button, when the power button is pressed, the portable electronic device is charged by the portable electrical power source, when the portable electronic device is pressed again, the portable electrical power source stop charging the portable electronic device.

3. The portable electrical power source of claim 2, wherein the base comprises power indicator configured to display the amount of power remaining in the chargeable battery.

4. The portable electrical power source of claim 3, wherein both the power button and the power indicator are positioned on the second surface.

5. The portable electrical power source of claim 1, wherein a height of the supporting portion is shorter than a height of the second receiving cavity, and the supporting portion is capable of moving in the second receiving cavity to adjust a position of the connector with respect to the supporting substrate.

6. The portable electrical power source of claim 1, wherein each locking structure comprises a locking portion, a torsion spring and a fixed pole, the locking portion is rectangular, and each of the locking portions is rotatably received in the cavity by the torsion spring and the fixed pole.

7. The portable electrical power source of claim 6, wherein the cavity is rectangular and comprises three sidewalls, the three sidewalls of each cavity defines a blind hole, a first through hole aligning with the blind hole, and a first receiving hole, one end of each of the locking portions defines a third receiving cavity, the third receiving cavity is rectangular, and comprises three internal sidewalls, each of the three internal sidewalls of the third receiving cavity defines a second through hole corresponding to the blind hole, a second receiving hole corresponding to the first receiving hole, and a third through hole corresponding to the first through hole, the first through hole runs through the bottom surface, one end of the torsion spring is inserted into the second receiving hole and the other end of the torsion spring is inserted into the first receiving hole, one end of the fixed pole runs through the first through hole, the torsion spring is received in the blind hole.

8. The portable electrical power source of claim 7, wherein one end of the first through hole in the bottom surface forms internal threads, the fixed pole comprises external threads formed on formed on an end of it, a length of the fixed pole is equal to a distance between the bottom surface and a bottom of the blind hole, and the external threads engage with the internal threads of the first through hole.

9. The portable electrical power source of claim 6, wherein each of the locking structures comprises a plastic plate positioned on an internal sidewall of the locking portion.

10. The portable electrical power source of claim 1, wherein the base comprises a top surface facing away from the bottom surface, and two opposite sidewalls connected between the first surface and the second surface, each of the top surface and the two opposite sidewalls defines a cavity, and the number of the locking structure corresponds to the number of the cavity.

11. The portable electrical power source of claim 10, wherein the base comprises a first charging port for charging the chargeable battery.

12. The portable electrical power source of claim 11, wherein the first charging port is positioned on the top surface.

* * * * *